Patented Oct. 23, 1923.

1,471,514

UNITED STATES PATENT OFFICE.

ALEXANDER T. ELLIOTT, OF LOS ANGELES, CALIFORNIA.

PROCESS FOR THE EXTRACTION OF METALS FROM ORES.

No Drawing. Application filed February 13, 1920. Serial No. 358,323.

*To all whom it may concern:*

Be it known that I, ALEXANDER T. ELLIOTT, a citizen of the United States, residing at Los Angeles, in the county of Los Angeles and State of California, have invented a new and useful Process for the Extraction of Metals from Ores, of which the following is a specification.

This invention relates to a process for extracting vanadium, uranium, and other metals, from ores thereof.

The invention is strictly adapted for extraction and recovery of vanadium and uranium from ores containing the same, either together or separately.

It is also applicable to extraction of copper, and other metals, especially when same occur in connection with uranium and vanadium, or both.

The main object of the present invention is to reduce the expense of the leaching reagents used in extracting the metal from the ore. For the extraction of vanadium and uranium it is desirable in many cases to use nitric acid as a leaching agent but on account of the high cost of nitric acid the extraction of the ore values by this re-agent is necessarily expensive.

My invention provides for economizing in the cost of the leaching re-agent by utilizing a metallic nitrate in conjunction with an acid capable of liberating the nitric acid radical in the solution and in contact with the ore.

My invention also provides for further economy by utilizing in the leaching operation the metallic nitrate produced as one of the by-products or end-products in the treatment of the solution for the separation of the metals therefrom.

My process may be carried out as follows:

The ore in a suitable state of division is placed in a suitable leaching vat, preferably a Pachuca tank, or agitating tank of any suitable construction, where it is mixed or agitated with a water solution of sodium nitrate and a suitable acid re-agent. The acid re-agent used for this purpose may consist of sulphuric acid in amount corresponding molecularly to the amount of sodium nitrate present, and the amount of sodium nitrate present may correspond to the amount of nitric acid which would be required to dissolve the vanadium and uranium content of the ore present in the tank. Any other suitable acid re-agent may be used, for example, acid sodium sulphate, or any acid salt. The solution in the leaching tank may also contain hydrochloric acid, or a suitable chloride capable of generating hydrochloric acid by reaction with the sulphuric acid present, for example, sodium chloride, it being understood that in that case a sufficient further amount of sulphuric acid will be added to the solution to react with this metallic chloride to produce hydrochloric acid therefrom. In some cases it is desirable to provide for the action of a certain amount of hydrochloric acid in this manner to ensure solution of certain forms of vanadium compounds in the ore. The agitation in the said tank is continued for a sufficient time and at suitable temperature, preferably at boiling temperature, to dissolve the desired amount of the vanadium and uranium content of the ore.

Air or steam agitation is preferably used in the tank to effect the mixture and accelerate the leaching operation. The resulting solution is then separated from the solid residues by any suitable filtering means, said solution containing the nitrates of vanadium and uranium, and generally of other metals present, either as impurities or as valuable constituents in the ore.

Assuming that the only other metals present are impurities, such as iron, aluminum and calcium, the solution is boiled with the addition of sodium carbonate in sufficient excess to precipitate these metals as carbonates, while retaining the vanadium and uranium in solution, the solution then being filtered from the precipitate and containing the vanadium and uranium in solution. This solution is then neutralized with a suitable acid, preferably nitric acid, or hydrochloric acid, and boiled to ensure expulsion of all of the carbon dioxide. An alkaline hydrate, preferably sodium hydrate, is then added to the solution in sufficient amount to precipitate the uranium present as hydrate, the solution being boiled during this operation and the resulting solution filtered off from the precipitate, neutralized with nitric acid or hydrochloric acid, and treated with ferrous sulphate at boiling temperature to precipitate vanadate of iron, enough ferrous sulphate being used to effect complete precipitation. The ferrous sulphate is added either in the form of a concentrated aqueous solution, or in the form of crystals, and the solution of vanadium to which it is added is not boiled during precipitation but simply brought to boiling temperature and then agitated. The final solution is filtered from the precipitated vanadate of iron, said solution containing sodium sulphate and sodium nitrate. This solution is returned to the leaching vat for repetition of the process in cyclic operation, it being generally desirable, however, to remove more or less of the sodium sulphate from the solution by evaporation and fractional crystallization, so as to prevent undue accumulation of sodium sulphate in the leaching liquid.

In any of the tanks or vats in which nitric acid is present during the reaction, either as added acid, or by production of nitric acid in the solution as above described, I prefer to use a closed tank to prevent loss of nitric acid or nitrous gases and, if desired, such closed tank may be connected with condenser or absorber means in well known manner to absorb any nitric or nitrous vapors given off, so as to reduce to a minimum the loss in the amount of nitric acid needed for carying out the process. With these precautions, a given amount of sodium nitrate, or equivalent salt, can be used to leach an indefinite quantity of ore by reason of the reproduction and cyclic re-use of the nitrate, as above described.

In case copper is present in the ore, it will be dissolved in the leaching operation above described and is preferably precipitated from the solution as a first step after the leaching, for example, by precipitation of the copper as cement copper by the action of metallic iron, or other reducing agent.

In the precipitation of uranium, as above described, ammonium hydrate may be used as a precipitating agent and may be regarded as the equivalent of the sodium hydrate above referred to.

In case hydrochloric acid or a metallic chloride is used in the leaching solution, the final treatment of the solution as above described will produce alkali chloride, which then reenters the leaching solution in cyclic operation, regenerating hydrochloric acid by reaction with sulphuric acid added to the solution, it being understood that in the cyclic repetition of the process sufficient fresh sulphuric acid is always added to correspond with the regenerated alkali nitrate and regenerated alkali chloride (if present), as well as any fresh alkali nitrate and metallic chloride which may be added to make up for losses.

What I claim is:

1. The process of leaching ore containing vanadium and uranium, which consists in treating the ore with a solution of nitrate of an alkali metal in the presence of an acid reagent, separating the resulting solution from the residue, treating the solution to remove metals other than vanadium and uranium, separating the uranium from the solution by treatment with an alkali metal hydrate, and treating the remaining solution with a metallic salt to precipitate the vanadium as a metallic vanadate the aforesaid operations resulting in the production of a solution containing an alkali metal nitrate, and using such solution in cyclic operation of the process.

2. The process of recovering vanadium and uranium from ores thereof, which consists in subjecting such ores to the leaching action of a solution containing an alkali metal nitrate and an acid reagent containing the sulphuric acid radical, treating the resulting solution to remove metals other than vanadium and uranium, precipitating the uranium by the addition of an alkali metal hydrate, and treating the remaining solution with a metallic sulphate to precipitate vanadium as a vanadate and produce a solution containing alkali metal sulfate together with alkali metal nitrate, separating alkali metal sulphate from the solution and using the remaining alkali metal nitrate in cyclic operation of the process.

In testimony whereof I have hereunto subscribed my name this 4th day of February, 1920.

ALEXANDER T. ELLIOTT.